Patented Dec. 24, 1935

2,025,099

UNITED STATES PATENT OFFICE 2,025,099

X-RAY ABSORPTION GLASS

Frederick Gelstharp, Tarentum, Pa., assignor to Pittsburgh Plate Glass Company, a corporation of Pennsylvania No Drawing. Application October 13, 1934, Serial No. 748,215

4 Claims. (Cl. 106—36.1)

The invention relates to glass designed to afford protection from X-rays. Such glass contains a relatively high percentage of lead oxide as the screening element, the efficiency of the glass as an X-ray cut-off depending upon the lead oxide content. The object of the present invention is the production of an improved glass of the type specified having a greater X-ray cut-off than it has heretofore been practicable to produce without making a glass which is too fluid in its molten state for proper casting. Briefly stated, this is accomplished by the use of barium oxide as a cut-off ingredient to supplement the lead oxide and as a substitute for the alkali which has heretofore been used in lead glass batches as a fluxing agent.

The departure from batches heretofore used will be apparent from a comparison of a typical lead glass batch and glass with the improved batches and glasses, as indicated in the tables which follow.

A standard or typical lead glass X-ray batch, as heretofore used, is as follows:

| | Parts |
|---|---|
| Sand | 1000 |
| Lead oxide | 1734 |
| Potassium nitrate | 280 |
| Antimony oxide | 10 |
| Total | 3024 |

An ultimate analysis of the glass produced from the foregoing batch shows the following result:

| | Percent |
|---|---|
| $SiO_2$ silicon dioxide | 34.78 |
| PbO lead oxide | 60.35 |
| Potassium oxide | 4.52 |
| Antimony oxide | .35 |
| | 100.00 |

If, in order to still further increase the X-ray cut-off, a higher percentage of lead oxide is used, the molten glass becomes too fluid for proper casting so that a limitation is thus presented against increasing the efficiency of the glass by increasing its lead content.

The batch preferably employed in making the improved glass is as follows:

| | Parts |
|---|---|
| Sand | 1000 |
| Barium carbonate | 60 |
| Barium nitrate | 120 |
| Lead oxide | 1984 |
| Antimony oxide | 10 |
| Total | 3173 |

It will be noted on comparison of the foregoing batch with the preceding one that no alkali is used, the barium compounds acting as fluxing agents, and that the proportion of lead oxide is increased.

An ultimate analysis of the glass produced from the foregoing batch shows the following result:

| | Percent |
|---|---|
| $SiO_2$ silicon dioxide | 32.1 |
| BaO barium oxide | 5.3 |
| PbO lead oxide | 62.1 |
| $Sb_2O_5$ antimony oxide | .5 |
| | 100.0 |

This glass presents substantial advantages over standard lead glass, such as that given in the first analysis. It has no greater fluidity in the molten state, and at the same time, the X-ray cut-off is substantially higher, due to the higher percentage of lead which the use of the barium compounds permits and to the added cut-off effect of the barium which replaces the potassium (or other alkali metal which might be used in place of the potassium), the cut-off effect of the barium being several times that of the alkali metal.

An alternative batch for producing a modification of the glass above is as follows:

| | Parts |
|---|---|
| Sand | 1000 |
| Barium carbonate | 496 |
| Barium nitrate | 120 |
| Lead oxide | 1640 |
| Antimony oxide | 10 |
| Total | 3266 |

An ultimate analysis of the glass produced from the foregoing batch is as follows:

| | Percent |
|---|---|
| $SiO_2$ silicon dioxide | 32.12 |
| BaO barium oxide | 14.63 |
| PbO lead oxide | 52.61 |
| $Sb_2O_5$ antimony oxide | .64 |
| | 100.00 |

This glass is superior to standard lead glass for the reasons recited in connection with the first form of the improved glass. Various other modifications of the improved glass are possible involving variations of the relative amounts of barium and lead from the formulas given, the essential feature of the improvement being the substitution of the barium compound or compounds for the whole or major portion of the alkali which has heretofore been regarded as necessary in the production of lead glasses.

What I claim is:

1. An X-ray absorption glass formed by fusing a glass batch substantially free from alkali and containing approximately 50 to 65 per cent of lead oxide and from 4 to 15 per cent of barium oxide, 2. An X-ray absorption glass formed by fusing a glass batch substantially free from alkali and containing about 62 per cent of lead oxide and about 5 per cent of barium oxide.

3. An X-ray absorption glass substantially free from alkali metal and comprising lead oxide and barium oxide totaling upwards of 60 per cent of the weight of the glass.

4. An X-ray absorption glass batch substantially free from alkali metal and including lead oxide, barium carbonate and barium nitrate with the lead oxide comprising at least 50 per cent of the weight of the batch.

FREDERICK GELSTHARP.